(12) United States Patent
Shimizu

(10) Patent No.: US 6,894,982 B1
(45) Date of Patent: May 17, 2005

(54) WIRELESS COMMUNICATION TERMINAL AND METHOD OF CONTROLLING OPERATION CLOCK FOR PROCESSING TRANSMITTING/RECEIVING DATA IN THE SAME

(75) Inventor: Seiji Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/167,267

(22) Filed: Oct. 6, 1998

(30) Foreign Application Priority Data

Oct. 8, 1997 (JP) .......................................... 09-274903

(51) Int. Cl.[7] .............................................. H04L 12/56
(52) U.S. Cl. ....................... 370/252; 370/350; 370/503
(58) Field of Search ................................ 370/324, 337, 370/347, 350, 503, 252; 455/556, 557, 572, 574, 296, 63, 67.1, 310, 231, 343; 375/354, 357; 713/400, 500, 501, 600

(56) References Cited

U.S. PATENT DOCUMENTS

| | | | | |
|---|---|---|---|---|
| 4,317,181 A | * | 2/1982 | Teza et al. ................... | 713/321 |
| 5,390,340 A | * | 2/1995 | Kondo ....................... | 455/38.1 |
| 5,450,086 A | * | 9/1995 | Kaiser ......................... | 342/42 |
| 5,604,745 A | * | 2/1997 | Hijii ........................... | 370/347 |
| 5,604,928 A | * | 2/1997 | Hamano et al. ............. | 455/310 |
| 5,848,281 A | * | 12/1998 | Smalley et al. ............. | 713/322 |
| 6,263,449 B1 | * | 7/2001 | Motohashi ................... | 713/501 |

FOREIGN PATENT DOCUMENTS

| | | | | |
|---|---|---|---|---|
| JP | 06132837 A | * | 5/1994 | ............ H04B/1/10 |
| JP | 8-166889 | | 6/1996 | |

OTHER PUBLICATIONS

Copy of Japanese Office Action dated Feb. 8, 2000 (and English translation of relevant portion).

* cited by examiner

Primary Examiner—Chi Pham
Assistant Examiner—Keith M. George
(74) Attorney, Agent, or Firm—Dickstein, Shapiro, Morin & Oshinsky, LLP.

(57) ABSTRACT

A timing of a receiving slot at the wireless receiving section 11 is detected at the interrupt generation section 12, which generates a receiving slot start interrupt signal (b) and a receiving slot end interrupt signal (c), during a period between a relevant receiving slot start interrupt signal (a) and a receiving slot end interrupt signal (c), an operation clock frequency of the CPU 21 in the data processing section 2 is variably controlled according to a receiving electric field strength, whereby the deterioration of receiving performance due to noises running from the data processing section 2 to the wireless section 1 at the receiving time can be reduced.

2 Claims, 5 Drawing Sheets

WIRELESS COMMUNICATION TERMINAL AND METHOD OF CONTROLLING OPERATION CLOCK FOR PROCESSING TRANSMITTING/RECEIVING DATA IN THE SAME

BACKGROUND OF THE INVENTION

The present invention relates to a wireless communication terminal. More particularly, it relates to a digital wireless portable information terminal in accordance with Time Division Multiplexing Access (TDMA) communication method.

This type of digital wireless portable information terminals is constituted so as to include a wireless transmitting/receiving section and a data processing section processing data which this wireless transmitting/receiving section transmits and receives. Data processing is performed with a high speed clock (whose frequency is large) so that a CPU in the relevant data processing section operates at a high speed.

In a digital portable information terminal having a built-in CPU which can be operated at such a high speed, it is obviously approved that noises generated with this high speed CPU plunge into the wireless transmitting/receiving section, has bad influence upon operations of the relevant wireless transmitting/receiving section.

Particularly, since the required CPU operation speed becomes higher accompanying with the enhancement of processing performance of a portable information terminal, noises generated has a tendency to increase still more. Therefore, how the deterioration of sensitivity of a wireless section, particularly of a wireless receiving section due to noises can be prevented at a terminal having a wireless communication function is a big problem.

In order to prevent this, a method that a data processing section and a wireless receiving section are completely separated by a shield not to receive interference of noises for the wireless receiving section is often employed. However, accompanying with a tendency of the miniaturization of terminals, the method for noise removal made by this shield has such problems that it needs a space for package and can not obtain an adequate effect of noise removal.

SUMMARY OF THE INVENTION

The objective of the present invention is to solve the problems of the prior art. Moreover, the objective is to provide a wireless communication terminal that can efficiently prevent noises against a wireless receiving section without employing a shield mechanism which requires a space for package.

The present invention, which is a wireless communication terminal, is characterized in that it comprises a wireless transmitting/receiving section transmitting and receiving data, detecting means detecting a receiving electric field strength at the foregoing wireless transmitting/receiving section, and operation clock control means controlling a frequency of an operation clock for processing data transmitted and received by the foregoing wireless transmitting/receiving section on the basis of a receiving electric field strength detected by the foregoing detecting means.

Then, the foregoing operation clock means is constituted so as to control a frequency of an operation clock to be smaller as a receiving electric field strength becomes smaller.

Moreover, the wireless transmitting/receiving means has memory means memorizing a value of a receiving electric field strength. The operation clock control means is characterized in that it is constituted so as to control a frequency of an operation clock according to a receiving electric field strength memorized by this memory means.

Furthermore, the wireless transmitting/receiving means performs transmitting/receiving processing in accordance with Time Division Multiplexing Access (TDMA) communication method. The operation clock control means is characterized in that it is constituted so as to control a frequency of an operation clock by its being synchronized with a timing of time division receiving operation.

Moreover, the wireless transmitting/receiving means is constituted so as to generate an interrupt signal at a starting time of a receiving slot that is a timing of time division receiving operation and an interrupt end signal at an ending time of said receiving slot. The operation clock control means is characterized in that it performs controlling a frequency of the foregoing operation clock according to the foregoing receiving electric field strength in response to the foregoing interrupt signal and ends off controlling a frequency of the foregoing operation clock in response to the foregoing interrupt end signal.

Specifically, the present invention will reduce noises generated from the data processing section and secure receiving performance without deteriorating processing performance of the data processing section so much by this means that the operation clock frequency of the CPU in the data processing section is constituted so as to be synchronized with a timing that a receiving slot of the wireless receiving section exists and be variably controlled according to a wireless receiving electric field strength.

BRIEF DESCRIPTION OF THE DRAWINGS

This and other objectives, features and advantages of the present invention will become more apparent upon a reading of the following detailed description and drawings, in which.

DESCRIPTION OF THE EMBODIMENT

The embodiment of the present invention will be described below.

Figure 1:
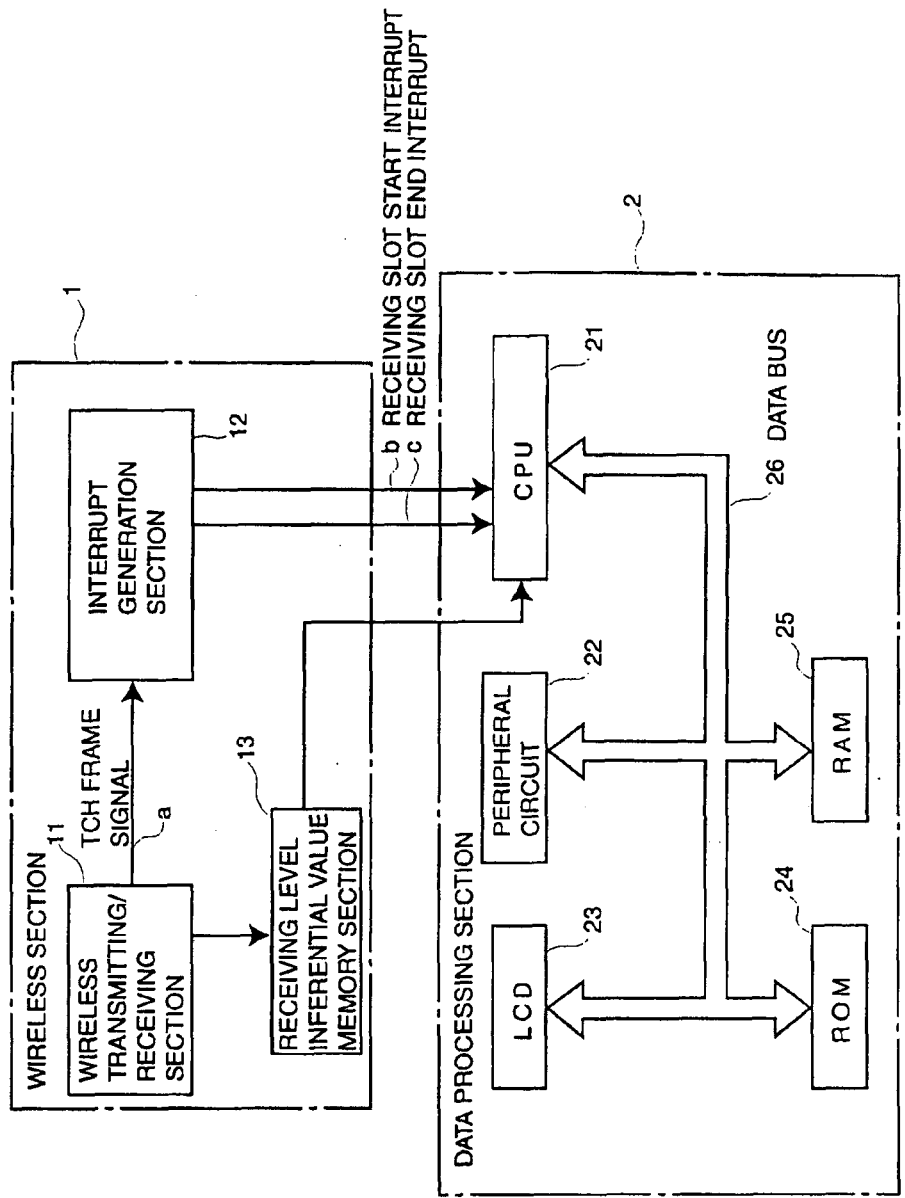
FIG. 1 is a block diagram of an embodiment of the present invention.

FIG. 1 is a block diagram of the embodiment of the present invention.

In FIG. 1, reference numeral 1 is a wireless section which transmits and receives data in accordance with Time Division Multiplexing Access (TDMA) communication method. Reference numeral 2 is a data processing section that processes data transmitted and received at the wireless section 1.

The wireless section 1 has a wireless transmitting/receiving section 11, an interrupt signal generation section 12 for receiving a TCH (Transmission Channel) frame signal (a) sent from the wireless transmitting/receiving section 11 as an input and generating a receiving slot start interrupt signal (b) which is synchronized with a start timing of a receiving time slot and a receiving slot end interrupt signal (c) which is synchronized with an ending timing of the receiving time slot, and a receiving level inferential value memory section 13 for detecting and storing a receiving electric field strength at the wireless transmitting/receiving section 11.

The data processing section 2 has a CPU 21 in which an operation clock frequency is variably controlled and data is processed with a controlled operation clock, its peripheral circuit 22, a display section of LCD 23 for performing various types of displays, a ROM 24 for read-only, a RAM 25 for freely read/write, and a data bus 26 for connecting respective these sections. The CPU 21 operates synchronizing with an operation clock which determines its operation speed, a frequency of this clock can be controlled according to a receiving level at the receiving level inferential value memory section 13. Moreover, a timing of frequency control of an operation clock is controlled in response to a receiving slot start interrupt signal (b), and a clock frequency return is controlled in response to a receiving slot end interrupt signal (c).

Figure 2:
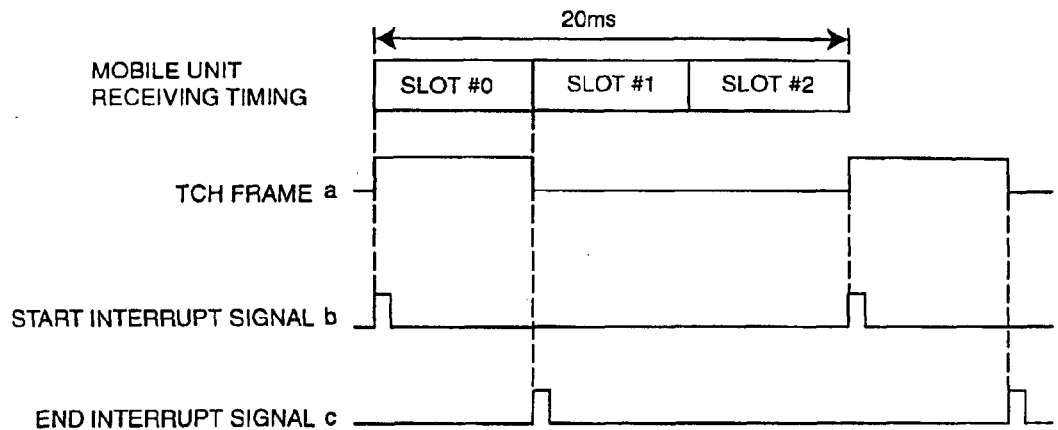
FIG. 2 is a timing chart showing an operation of the embodiment of the present invention.

FIG. 2 is a timing chart showing the relations between a TCH (Transmission Channel) frame signal (a) which is a standard interface signal utilized when performing data communication in accordance with PDC (Personal Digital Cellular) method, a mobile unit receiving slot (receiving timing), a receiving slot start interrupt signal (b), and a receiving slot end interrupt signal (c). Hereupon, assume that a slot #0 is a receiving slot of a relevant terminal.

A TCH frame (a) indicating a period of this slot #0 is active during the period and is led out from the wireless transmitting/receiving section 11 to the interrupt generation section 12. Both a start interrupt signal (b) which is synchronized with a starting timing of this TCH frame signal (a) and an end interrupt signal (c) which is synchronized with an end timing of the TCH frame signal (a) are generated from the interrupt generation section 12.

The CPU 21 starts controlling an operation clock frequency in response to this start interrupt signal (b) and determines a clock frequency according to a receiving level inferential value stored at the receiving level inferential memory section 13.

Figure 3:
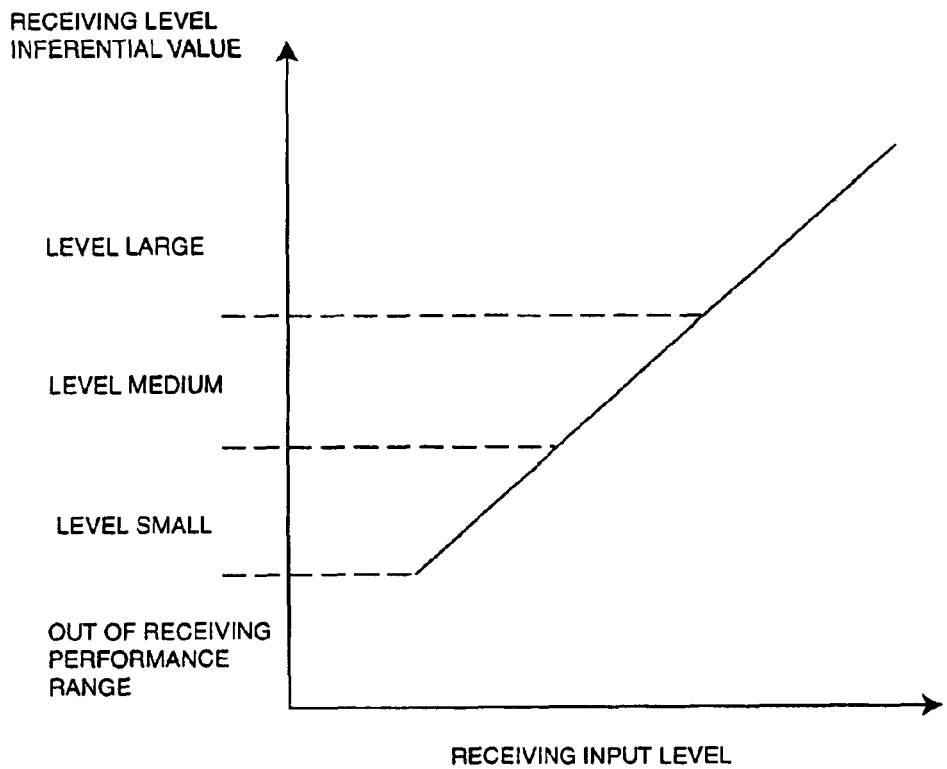
FIG. 3 is a graphical presentation showing an example of the correlation between a receiving input level and a receiving level inferential value.

FIG. 3 is a graphical presentation showing the correlation between a receiving input level and a receiving level inferential value stored at the receiving level inferential value memory section 13 and also showing the cases indicated by three (3) stages in which respective receiving level inferential values are large, medium and small.

The receiving level inferential value memory section 13 selects and memorizes a receiving level inferential value corresponding to a receiving electric field strength (a receiving input level) detected at the wireless transmitting/ receiving section 11 according to the graphical presentation of the correlation shown in FIG. 3. According to FIG. 3, clock frequencies are variably controlled in compliance with receiving level inferential values of those three (3) stages.

Figure 4:
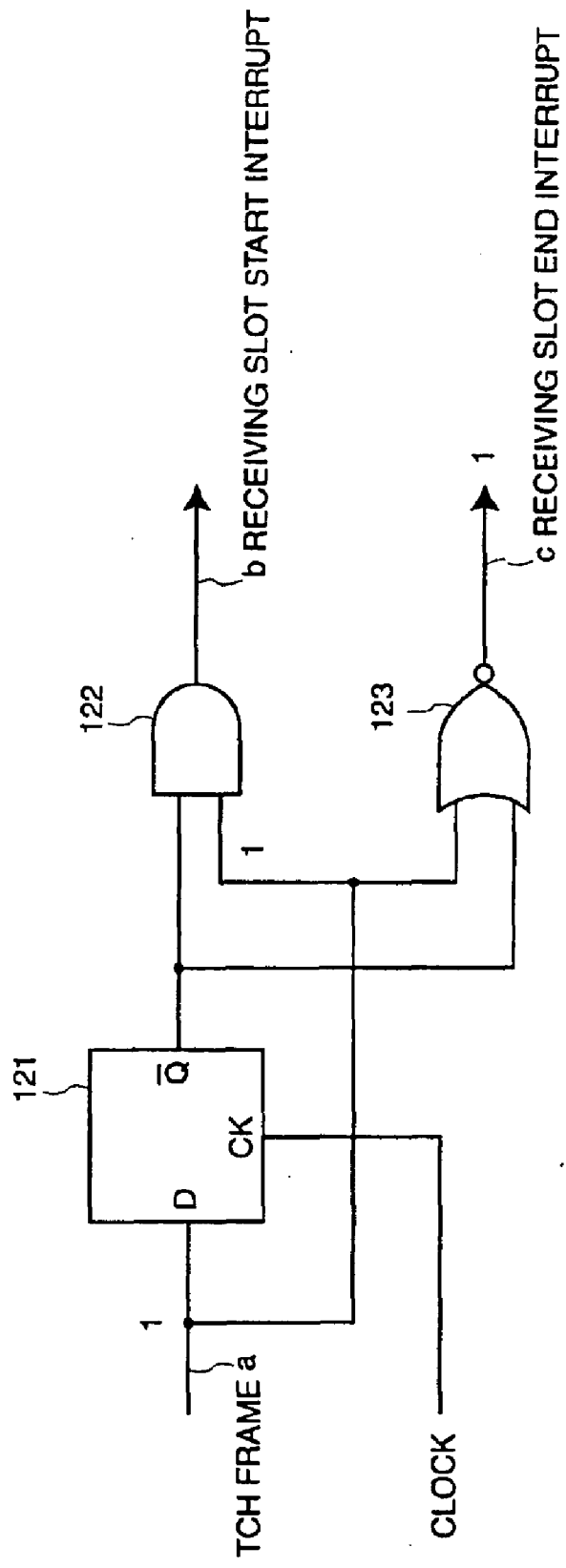
FIG. 4 is a circuit diagram showing an example of an interrupt signal generation section 12.

FIG. 4 is a circuit diagram showing an example of the interrupt generation section 12. In FIG. 4, a TCH frame signal (a) is shown as data input supplied to a DFF (D-type Flip-Flop circuit) 121, and a clock signal is supplied to the DFF as a clock input. The reversed Q output of this DFF 122 is shown as an input supplied to an AND gate 122 and as an input supplied to an OR gate 123 respectively. As the other input, a TCH frame signal (a) is supplied to the AND gate and to the OR gate respectively. Moreover, a start interrupt signal (b) as an output outputted from the AND gate 122 and an end interrupt signal (c) as an output outputted from the OR gate 123 are led out respectively.

Figure 5A:
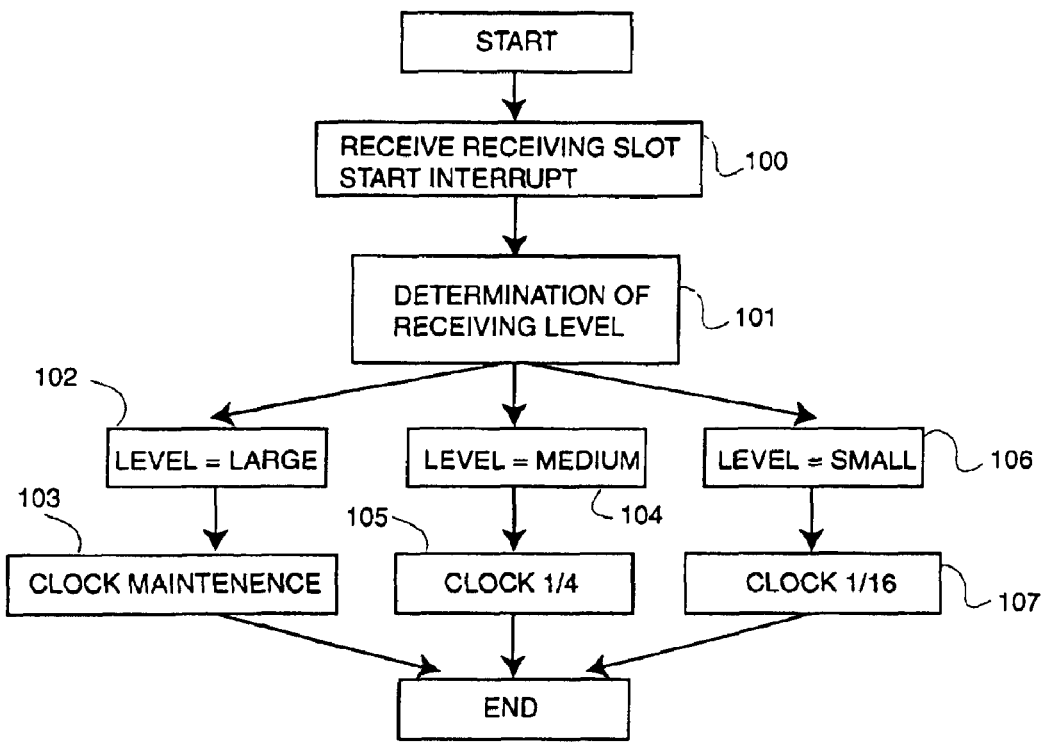
FIGS. 5A and 5B are flow charts showing examples of clock frequency control operations of a CPU 21.
Figure 5B:
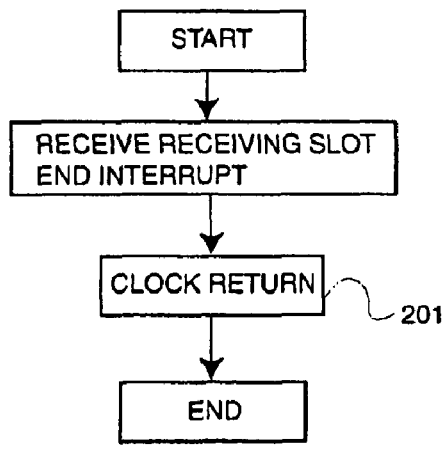

FIG. 5A and FIG. 5B are flow charts showing processing operations of clock control of the CPU 21. FIG. 5A is a control flow chart in the case of receiving a receiving slot start interrupt signal, in which, responding to a start interrupt signal (Step 100), the CPU 21 reads out and determines a receiving level inferential value from the memory section 13 (Step 101). If a level is at the stage of "large" (Step 102), a clock frequency is not variably controlled (Step 103). Moreover, if a level is at the stage of "medium" (Step 104), a clock frequency is lowered to be ¼ of the original frequency (Step 105). Furthermore, if a level is at the stage of "small" (Step 106), a clock frequency is lowered to be ¹⁄₁₆ of the original frequency (Step 107).

Then, as shown in the flow chart of FIG. 5B, responding to a receiving slot end interrupt signal (c) (Step 200), a clock frequency is made to be returned to the original frequency (to the reference frequency before variable controlled) (Step 201).

Figure 6:
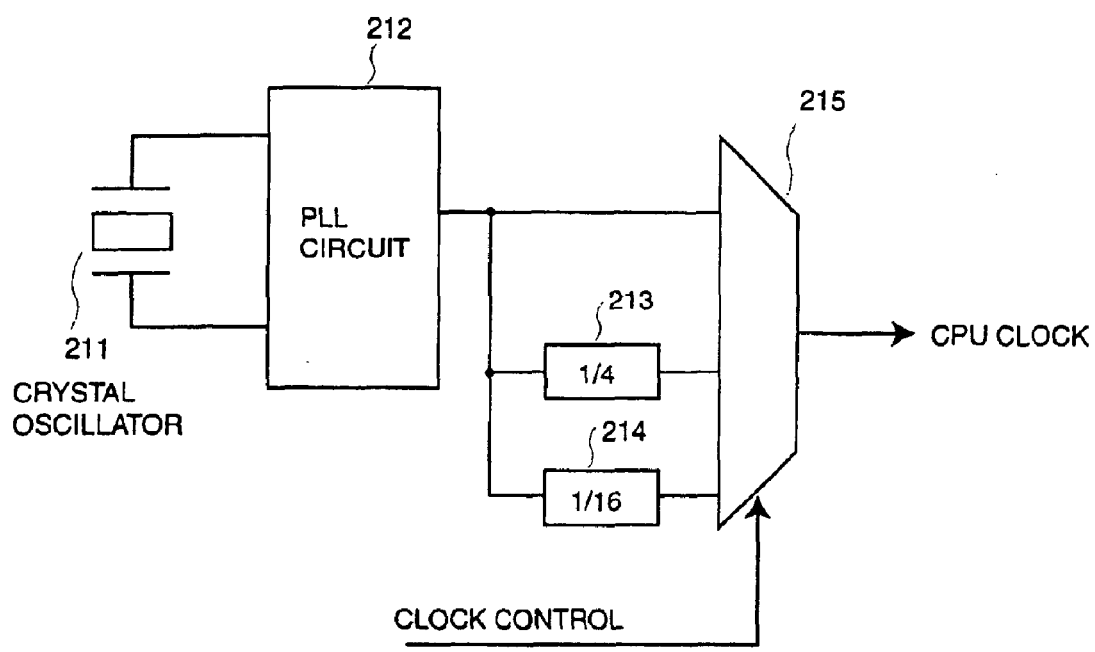
FIG. 6 is a circuit diagram showing an example of a clock selection function of the CPU 21.

FIG. 6 is a circuit block diagram for clock control, which includes a crystal oscillator 211 for oscillating a reference frequency signal, a PLL (Phase Locked Loop) circuit 212 for generating a clock phase-synchronized with an oscillation frequency of the crystal oscillator 211, dividers 213, 214 for making frequencies be ¼ and ¹⁄₁₆ of the original frequencies by performing frequency division, and a selector 215 for selectively leading out one output out of an output outputted from the PLL circuit and frequency division outputs outputted from the dividers 213, 214.

Clock frequency is freely controlled by the selector 215 selecting control according to a clock control signal on the basis of a receiving level inferential value read out from the receiving level inferential value memory section 13.

Specifically, if a receiving level inferential value is at the stage of "large", the selector 215 selects an output outputted from the PLL circuit 212, selects an output outputted from the divider 213 if a receiving level inferential value is at the stage of "medium", and selects an output outputted from the divider 214 if a receiving level inferential value is at the stage of "small".

As described above, according to the present invention, noise generation at the receiving section can be prevented by reducing a frequency of an operation clock of the CPU in the case where a receiving electric field is weak at a timing that a receiving slot exists, and in the other cases, an effect of noise reduction can be obtained by the clock frequency remaining to be at a high speed without sacrificing data processing speed.

Moreover, wireless noises will be a problem mainly at a receiving signal, therefore, by making an operation frequency of the CPU be synchronized with a receiving slot and controlling it, it is not necessary to strictly settle a shield designed for wireless noises, consequently, an effect of the miniaturization of and lightening a portable terminal can be also provided.

The entire disclosure of Japanese Patent Application No. 9-274903 filed on Oct. 8, 1997 including specification, claims, drawings and summary are incorporated herein by reference in its entirety.

What is claimed is:

1. A wireless communication terminal comprising:

wireless transmitting/receiving means for transmitting and receiving data:

detecting means for detecting a strength of a receiving electric field by said wireless transmitting/receiving means; and operation clock control means for controlling, based on said receiving electric field strength detected by said detecting means, a frequency of an operation clock used for processing data transmitted and received by said wireless transmitting/receiving means wherein:

said detecting means includes means for selecting and maintaining a receiving level inferential value from a plurality of previously stored receiving level inferential values, wherein said selected receiving level inferential value corresponds to said detected receiving electric field; and said operation clock control means includes:

a plurality of operation clock generation means that generate operation clocks corresponding to said receiving level inferential values; and selecting means for selecting one of said plurality of operation clock generation means corresponding to said receiving level inferential value that is maintained by said detecting means.

2. In a wireless communication transceiver, a method of controlling an operation clock for processing transmitted/received data, said method comprising the steps of:

detecting a strength of a receiving electric field; and controlling a frequency of said operation clock based on said detected strength of said receiving electric field, wherein:

said detecting step includes a step of selecting, out of said plurality of receiving level inferential values, a receiving level inferential value corresponding to said detected strength of said receiving electric field; and said control step includes a step of selecting, out of said plurality of operation clocks, an operation clock corresponding to said selected receiving level inferential value.

* * * * *